United States Patent
Winter et al.

(10) Patent No.: US 11,344,968 B2
(45) Date of Patent: May 31, 2022

(54) METHOD FOR PRODUCING ROLL-BONDED METAL SHEETS

(71) Applicants: voestalpine Grobblech GmbH, Linz (AT); VDM Metals International GmbH, Werdohl (DE)

(72) Inventors: Franz Winter, Linz (AT); Claudius Schindler, Gmünd (AT); Franz-Josef Wahlers, Lünen (DE); Jutta Kloewer, Düsseldorf (DE); Bodo Gehrmann, Plettenberg (DE); Heike Hattendorf, Werdohl (DE)

(73) Assignees: voestalpine Grobblech GmbH, Linz (AT); VDM Metals International GmbH, Werdohl (DE)

( * ) Notice: Subject to any disclaimer, the term of this patent is extended or adjusted under 35 U.S.C. 154(b) by 245 days.

(21) Appl. No.: 16/325,068

(22) PCT Filed: Aug. 10, 2017

(86) PCT No.: PCT/EP2017/070347
§ 371 (c)(1),
(2) Date: Feb. 12, 2019

(87) PCT Pub. No.: WO2018/029305
PCT Pub. Date: Feb. 15, 2018

(65) Prior Publication Data
US 2021/0078098 A1    Mar. 18, 2021

(30) Foreign Application Priority Data

Aug. 12, 2016  (DE) .................... 10 2016 115 026.6

(51) Int. Cl.
*B23K 20/04* (2006.01)
*B32B 15/01* (2006.01)
(Continued)

(52) U.S. Cl.
CPC .............. *B23K 20/04* (2013.01); *B23K 20/00* (2013.01); *B32B 15/01* (2013.01); *B32B 15/015* (2013.01);
(Continued)

(58) Field of Classification Search
CPC ........ B23K 20/04; B23K 20/00; B32B 15/01; B32B 15/015; B32B 15/04; B32B 15/043;
(Continued)

(56) References Cited

U.S. PATENT DOCUMENTS 3,615,902 A   10/1971  Lesney
4,178,417 A   12/1979  Oda et al.
(Continued)

FOREIGN PATENT DOCUMENTS

CN    105164290 A    12/2015
DE      1101916 B     3/1961
(Continued)

OTHER PUBLICATIONS

Machine Translation, Takahashi et al., JP 05-214499 A, Aug. 1993. (Year: 1993).*
(Continued)

*Primary Examiner* — Michael E. La Villa
(74) *Attorney, Agent, or Firm* — Cooper Legal Group, LLC (57) ABSTRACT

A roll-bonded clad metal sheet and a method for producing a roll-bonded clad metal sheet is provided. The roll-bonded clad sheet includes a metallic base material layer and a metallic cladding material layer which are joined to one another by a metallurgical bond. The metallic cladding material layer includes a nickel-based material whose chemical composition includes, in % by mass, a proportion of more than 50% of Ni and a proportion of 3.1% of Nb. The metallurgical bond is obtained by a thermomechanical roll- (Continued)

ing process including a first rolling phase for prerolling, a second rolling phase for final forming and a cooling time between the first rolling phase and the second rolling phase, wherein a final rolling temperature of the second rolling phase is set to a value equal to or less than 880° C.

19 Claims, 4 Drawing Sheets

(51) Int. Cl.
    *C21D 8/02*     (2006.01)
    *C22C 19/05*     (2006.01)
    *C21D 8/04*     (2006.01)
    *B32B 15/04*     (2006.01)
    *B32B 15/18*     (2006.01)
    *C22C 19/03*     (2006.01)
    *B23K 20/00*     (2006.01)

(52) U.S. Cl.
CPC ............ *B32B 15/04* (2013.01); *B32B 15/043* (2013.01); *B32B 15/18* (2013.01); *C21D 8/02* (2013.01); *C21D 8/0205* (2013.01); *C21D 8/0226* (2013.01); *C21D 8/0231* (2013.01); *C21D 8/0236* (2013.01); *C21D 8/0247* (2013.01); *C21D 8/0263* (2013.01); *C21D 8/04* (2013.01); *C21D 8/0405* (2013.01); *C21D 8/0421* (2013.01); *C21D 8/0426* (2013.01); *C21D 8/0431* (2013.01); *C21D 8/0447* (2013.01); *C21D 8/0463* (2013.01); *C22C 19/03* (2013.01); *C22C 19/05* (2013.01); *C22C 19/051* (2013.01); *C22C 19/055* (2013.01); *B32B 2311/22* (2013.01); *B32B 2311/30* (2013.01); *C21D 2251/00* (2013.01); *C21D 2251/02* (2013.01); *Y10T 428/12854* (2015.01); *Y10T 428/12931* (2015.01); *Y10T 428/12937* (2015.01); *Y10T 428/12944* (2015.01); *Y10T 428/2495* (2015.01); *Y10T 428/24942* (2015.01); *Y10T 428/24967* (2015.01)

(58) Field of Classification Search
CPC . B32B 15/18; B32B 2311/22; B32B 2311/30; C21D 8/0426; C21D 8/02; C21D 8/0226; C21D 8/0205; C21D 8/0231; C21D 8/0236; C21D 8/0247; C21D 8/0263; C21D 8/04; C21D 8/0405; C21D 8/0421; C21D 8/0431; C21D 8/0447; C21D 8/0463; C21D 2251/02; C21D 2251/00; C22C 19/055; C22C 19/03; C22C 19/05; C22C 19/051; Y10T 428/12854; Y10T 428/12931; Y10T 428/12937; Y10T 428/12944; Y10T 428/24967; Y10T 428/2495; Y10T 428/24942
See application file for complete search history.

(56) References Cited

U.S. PATENT DOCUMENTS

| | | | |
|---|---|---|---|
| 4,861,682 A | | 8/1989 | Hashimoto et al. |
| 4,917,969 A | * | 4/1990 | Pircher ................. B32B 15/011 428/685 |

FOREIGN PATENT DOCUMENTS

| | | |
|---|---|---|
| DE | 2019494 A1 | 2/1971 |
| DE | 4409004 A1 | 9/1995 |
| DE | 69511717 T2 | 2/2000 |
| DE | 60304191 T2 | 12/2006 |
| EP | 0315576 A1 | 5/1989 |
| EP | 0320773 A2 | 6/1989 |
| EP | 0488222 A2 | 6/1992 |
| EP | 1416059 A1 | 5/2004 |
| EP | 1726675 A2 | 11/2006 |
| EP | 2050532 A1 | 4/2009 |
| EP | 2157197 A2 | 2/2010 |
| EP | 1416059 B1 | 5/2013 |
| EP | 2050532 B1 | 6/2016 |
| JP | 05-214446 A * | 8/1983 |
| JP | S5927676 B2 | 7/1984 |
| JP | S62110879 A | 5/1987 |
| JP | 05214446 A | 8/1993 |
| JP | H05214499 A | 8/1993 |
| JP | H05230571 A | 9/1993 |
| JP | 2767009 B2 | 6/1998 |
| JP | H1177374 A | 3/1999 |
| JP | 3051274 B2 | 6/2000 |
| JP | 3313440 B2 | 8/2002 |
| JP | 3514889 B2 | 3/2004 |
| JP | 3836977 B2 | 10/2006 |
| JP | 2008030086 A | 2/2008 |
| JP | 4252645 B | 4/2009 |
| KR | 20150075327 A | 7/2015 |
| KR | 20150075332 A | 7/2015 |
| WO | 2011079341 A2 | 7/2011 |

OTHER PUBLICATIONS

Machine Translation, Takahashi, JP 05-214446 A, Aug. 1983. (Year: 1983).*
International Patent Application No. PCT/EP2017/070347, International Search Report, dated Dec. 15, 2017. English Translation.
International Patent Application No. PCT/EP2017/070347, Written Opinion, dated Dec. 15, 2017. English Translation.
VDM Metals—VDM Alloy 625, Nicrofer 6020 hMo; Data Sheet No. 4118, Jan. 2016.
Corresponding Japanese Patent Application No. 2019-505203, Office Action dated May 12, 2020. English Translation.
International Preliminary Report on Patentability, International Patent Application No. PCT/EP2017/070347, dated Feb. 12, 2019. English Translation.

* cited by examiner

METHOD FOR PRODUCING ROLL-BONDED METAL SHEETS

TECHNICAL FIELD

The invention relates to roll-bonded clad metal sheets and a process for producing roll-bonded clad metal sheets.

BACKGROUND

Roll-bonded clad metal sheets are used, for example, in fields of industry in which a high corrosion resistance to chemically aggressive ambient media, for example sea water, petroleum, natural gas, acid- or chlorine-containing ambient media, etc., is required over a sometimes wide temperature range. For example, roll-bonded clad metal sheets are used for pipelines, in particular onshore and offshore pipelines, or in pressure vessel construction. Apart from the required corrosion resistance and strength, a high toughness of the metal sheets even at low temperatures and also good weldability are of great practical importance for many applications of roll-bonded clad metal sheets.

In cladding by roll bonding, at least one metallic base material layer and at least one metallic cladding material layer are brought together and a metallurgical bond is produced between the individual layers by rolling at elevated temperature. This gives a metallic composite material which is referred to as roll-bonded clad metal sheet. While the base material usually has the task of taking up the static and dynamic loads, the cladding material protects the base material against corrosive attack.

Accelerated cooling of a thick plate to a temperature below Ar3 between partial and final forming and subsequently heating it inductively to above Ac3 is already known from WO 2011/079341 A2.

SUMMARY OF DISCLOSURE

An objective in this field of technology is to produce roll-bonded clad metal sheets having a high toughness. In particular, roll-bonded clad metal sheets comprising a metallic base material conforming to the standard API 5L or comparable standards such as DNV OS-F101, ISO 3183, etc., having improved toughness at the same temperature or the same toughness at a comparatively lower temperature should be produced.

The object is achieved by the features of the independent claims. Embodiments and further developments are subject matter of the dependent claims.

A process for producing a roll-bonded clad metal sheet accordingly comprises bringing together of a metallic base material layer and a metallic cladding material layer to produce a layer packet; heating of the layer packet; thermomechanical rolling of the heated layer packet, which comprises a first rolling phase for prerolling the heated layer packet to form a metallurgical bond between the metallic base material layer and the metallic cladding material layer, a second rolling phase for final forming of the layer packet and also a cooling time between the first rolling phase and the second rolling phase; wherein the cladding material is a nickel-based material whose chemical composition comprises, in % by mass, a proportion of more than 50% of Ni and a proportion of $\leq 3.1\%$ of Nb, preferably 2.8% of Nb, in particular Nb+Ta$\leq 2.8\%$ and possibly further alloy elements, and the final rolling temperature of the second rolling phase is set to a value equal to or less than 880° C., in particular 850° C.

Due to setting of a low Nb content of the cladding material, no weakening or destruction of the metallurgical bond between the cladding material and the base material (yet) occurs in thermomechanical rolling with a final rolling temperature of the second rolling phase of equal to or less than 880° C., in particular 850° C. As a result of the low final rolling temperature, the base material of the roll-bonded clad metal sheet acquires very good (i.e. improved) toughness properties.

Thus, according to the invention, the desired improvement in the toughness of the base material of the roll-bonded clad metal sheet is achieved by means of a measure which is not applied to the base material itself but to the cladding material and the process conditions of thermomechanical rolling. Although the chemical composition of the cladding material does not have a direct effect on the toughness of the base material of the roll-bonded clad metal sheet, setting of a low Nb content of the cladding material results in the yield stress of the cladding material being reduced compared to the yield stress of a cladding material having a higher Nb content and otherwise the same chemical composition. In this way, the yield stress of the cladding material is brought close to the (smaller) yield stress of the base material. Due to the smaller difference between the yield stresses of the two materials, final rolling (i.e. the final forming in the second rolling phase) of the layer packet can be carried out at the abovementioned lower temperatures without the metallurgical bond between the materials being destroyed. Since the lower final rolling temperature leads, as indicated, to improved toughness properties of the base material, the change in the chemical composition of the cladding material "indirectly" improves a mechanical property (toughness) of the base material.

The final rolling temperature of the second rolling phase can optionally be set to be equal to or less than 830° C. This results in the base material of the roll-bonded clad metal sheet acquiring further-improved toughness properties.

The final rolling temperature can be lower, preferably at least 10° C. lower, than the recrystallization stop temperature of the metallic base material layer.

The chemical composition of the cladding material can advantageously comprise, in % by mass, a proportion of Nb of $\leq 2.5\%$ or 2.2% or 2.0%, in particular Nb+Ta$\leq 2.5\%$ or 2.2% or 2.0%. Relatively low Nb contents of the cladding material allow a further decrease in the final rolling temperature of the second rolling phase and thus give improved toughness properties of the base material (and therefore also of the roll-bonded clad metal sheet).

The cladding material can advantageously be a nickel-based alloy, i.e. the main constituent of the alloy is nickel. In particular, the cladding material can be a nickel-chromium-molybdenum-niobium alloy.

A customary nickel-based alloy is VDM® Alloy 625 having the material number 2.4856-NiCr22Mo9Nb in the EN standard. Corresponding nickel-based alloys are referred in the standard ISO as ISO NC22DNb, in the standard UNS as UNS N06625, in the standard AFNOR as NC22DNb and also, for example, in the standard API as LC2262.

In particular, the cladding material can have, in % by mass, a chemical composition comprising 58%$\leq$Ni 73%, 20%$\leq$Cr 25%, 0%$\leq$Fe$\leq$5%, 0%$\leq$C$\leq$0.03% or 0.1%, 0%$\leq$Mn$\leq$0.5%, 0%$\leq$Si 0.5%, 0%$\leq$Co$\leq$1%, 0%$\leq$Al$\leq$0.4%, 0%$\leq$Ti$\leq$0.4%, 0%$\leq$P$\leq$0.015%, 0%$\leq$S$\leq$0.015%, 8%$\leq$Mo$\leq$10%, 1.5%$\leq$Nb+Ta$\leq$x, where x=3.1%, 2.8%, 2.5% or 2.2%, balance impurities.

This composition corresponds to the composition of Alloy 625 having the UNS number N06625 and also essentially to the material number 2.4856-NiCr22Mo9Nb in the EN standard, but an Nb or (Nb+Ta) content which has been reduced according to the invention is used instead of the 3.15%≤Nb+Ta≤4.14 specified there. In addition, a lower and additionally an upper limit value for nickel was added as, for example, in ISO 6208; however, the upper limit value for Ni (in the case of Alloy 625 in the VDM data sheet: 71%) and/or for Cr (in the case of Alloy 625 in the VDM data sheet: 23%) is increased in each case by two percent since the reduction in the Nb or (Nb+Ta) content can be replaced by an increase in, for example, the Ni and/or Cr content without the corrosion properties of the cladding material being influenced.

The Nb+Ta content is preferably in the range from 1.5% to 3.1%. If required, the Nb+Ta content can be limited further as follows (in % by mass):

1.5%≤Nb+Ta≤3.1%

1.5%≤Nb+Ta≤2.8%

1.5%≤Nb+Ta≤2.5%

1.5%≤Nb+Ta≤2.2%

1.7%≤Nb+Ta≤2.3%.

The Ni content is preferably in the range from 58% to 73%. Ni can preferably be set as follows in the alloy (in % by mass):

59%≤Ni≤69%

60%≤Ni≤69%.

Cr is, as mentioned above, important for the corrosion resistance. Excessively high contents promote the formation of undesirable phases. The Cr content is preferably in the range from 21% to 25%. Cr can preferably be set as follows in the alloy (in % by mass):

21%≤Cr≤23%.

The C content is preferably in the range from 0% to 0.1%. Higher contents reduce the corrosion resistance by formation of chromium carbides at the grain boundaries. C can preferably be set as follows in the alloy (in % by mass):

0%≤C≤0.03%.

The Mn content is preferably in the range from 0% to 0.5%. Mn can preferably be set as follows in the alloy (in % by mass):

0%≤Mn≤0.3%.

The Si content is preferably in the range from 0% to 0.5%. Excessively high contents promote the formation of undesirable phases. Si can preferably be set as follows in the alloy (in % by mass):

0%≤Si≤0.4%.

The Co content is preferably in the range from 0% to 1%. Co can preferably be set as follows in the alloy (in % by mass):

0%≤Co≤0.7%.

The Al content is preferably in the range from 0% to 0.4%. Al can preferably be set as follows in the alloy (in % by mass):

0%≤Al≤0.3%.

The Ti content is preferably in the range from 0% to 0.4%. Ti can preferably be set as follows in the alloy (in % by mass):

0%≤Ti≤0.3%.

Furthermore, the alloy can contain Ta, but this incurs high metal costs. For this reason, the content of Ta in the alloy is preferably limited to 0%≤Ta≤1%. The content of Ta can also be limited as follows (in % by mass):

0%≤Ta≤0.5%

0%≤Ta≤0.2%.

Furthermore, the alloy can if required contain from 0% to 0.008% of boron in order to improve the processability at relatively high temperatures. Higher contents impair the weldability.

Furthermore, a maximum of 0.5% of Cu can be present in the alloy. The content of Cu can also be limited as follows (in % by mass):

Cu≤0.3%.

Furthermore, a maximum of 1% of W can be present in the alloy. Like Mo, W improves the corrosion resistance. However, like Mo, W also brings about high mixed crystal strengthening and is thus contrary to the objective of a reduced yield stress of the cladding material, for which reason the content of W is preferably restricted to not more than 1%. The content of W can also be limited as follows (in % by mass):

W≤0.50%

W≤0.20%.

Furthermore, a maximum of 0.5% of V can be present in the alloy.

Furthermore, a maximum of 0.05% of N can be present in the alloy. N improves the corrosion resistance. However, additions of nitrogen also bring about strengthening and are thus contrary to the objective of a reduced yield stress of the cladding material, for which reason the content of nitrogen is preferably restricted to a maximum of 0.05%.

The element Mg can be present in the alloy in amounts of not more than 0.05% in order to improve the processability.

The element Ca can be present in the alloy in amounts of not more than 0.05% in order to improve the processability.

Finally, among impurities, the elements lead, zinc and/or tin can be present in amounts as follows:

Pb≤0.002%

Zn≤0.002%

Sn≤0.002%.

Higher contents impair the processability.

The base material can preferably be a carbon steel. In particular, it is possible to use carbon steels corresponding to one or more of standards API 5L, in particular API 5L grade X65, DNV OS-F101, ISO 3183 or comparable standards, in particular with a chemical composition of 0%≤C≤0.3% and 0%≤Mn≤1.65%. For example, the base material can be a carbon steel (API 5L grade X65) having the chemical composition in % by mass 0%≤C≤0.16%, 0%≤Si≤0.50%, 1.10%≤Mn≤1.65%, 0%≤P≤0.022%, 0% S≤0.010%, 0%≤Nb≤0.05%, 0%≤Ti≤0.06%, 0%≤V≤0.10%, balance iron and impurities. The base material can, for example, also be a steel corresponding to API 5L grade X52, API 5L grade X56, API 5L grade X60 and API 5L grade X70.

Another statement of the composition of an API 5L grade X65 steel is, for example, 0%≤C≤0.16%, 0%≤Si≤0.50%, 1.10%≤Mn≤1.60%, 0%≤P≤0.022%, 0%≤S≤0.005%, 0%≤Cr≤0.50%, 0%≤Mo≤0.20%, 0%≤Ni≤0.20%, 0.020%≤Al≤0.060%, 0%≤Cu≤0.20%, 0%≤N≤0.014%, 0%≤Nb≤0.05%, 0%≤Ti≤0.02%, 0%≤V 0.10%, 0%≤As≤0.02%, 0%≤Sb≤0.01%, 0%≤Sn 0.015%, 0%≤Pb≤0.010%, 0%≤Bi≤0.010%, 0%≤Ca≤0.005%, 0%≤B≤0.0005%, 0%≤Cr+Mo+Ni+Cu≤0.5%, 0%≤Nb+V≤0.10% and 0%≤Nb+V+Ti≤0.15%, balance iron and impurities, where, furthermore, the formulae CEV≤0.43% and Pcm 0.25% are satisfied, where CEV=C+Mn/6+(Cr+Mo+V)/5+(Ni+Cu)/15 and Pcm=C+Si/30+(Mn+Cu+Cr)/20+Ni/60+Mo/15+V/10+5B.

Rolling in the first rolling phase can be carried out at an initial rolling temperature of from 1000° C. to 1200° C. In the first rolling phase in particular, the layers of the layer packet are homogenized over their entire cross section and their thicknesses are reduced. In addition, a metallurgical bond between the layers is created. The mechanical properties of the roll-bonded clad metal sheet are not yet set here.

The cooling time is preferably made at least so long that the temperature of the metallic base material layer has gone below the recrystallization stop temperature of the metallic base material; however, for specific applications, the cooling time can also be reduced in such a way that the second rolling phase commences at a temperature above the recrystallization stop temperature. Depending on the thickness of the layers and possibly other influencing parameters (e.g. positive cooling), the cooling time can, for example, be in the range from 3 to 15 minutes, with greater thicknesses generally making longer cooling times necessary. The cooling process can be carried out by means of continuous cooling, but it is also possible for the temperature to go through a profile having at least one intermediate heating phase.

The second rolling phase is, for example, carried out at an initial rolling temperature of not more than 50° C. above, in particular 40° C. or 30° C. above, the final rolling temperature. The greater the thickness of the layer packet (which has already been reduced in the first rolling phase), the lower the initial rolling temperature required. Depending on the geometry and also the available rolling moments and rolling forces, the second rolling phase can even be commenced at an initial rolling temperature below the desired final rolling temperature.

One working example also relates to a roll-bonded clad metal sheet comprising: a metallic base material layer and a metallic cladding material layer which are joined to one another by a metallurgical bond, where the cladding material is a nickel-based material whose chemical composition in % by mass comprises a proportion of more than 50% of Ni and a proportion of Nb of ≤3.1%, preferably ≤2.8% of Nb, in particular Nb+Ta≤2.8%, and is obtainable by a thermomechanical rolling process comprising a first rolling phase for prerolling, a second rolling phase for final forming and also a cooling time between the first rolling phase and the second rolling phase, where the final rolling temperature of the second rolling phase is set to a value equal to or less than 880° C., in particular 850° C.

The thermomechanical rolling process can thus comprise two or more than two rolling phases, with the periods of time between the individual rolling phases being able to be utilized for at least one accelerated cooling and/or heating of the metal sheet.

The metallic base material layer of the roll-bonded clad metal sheet can have a thickness of equal to or greater than 25 mm, in particular equal to or greater than 30 or 35 mm. Since the toughness properties of metal sheets which have been clad by means of thermomechanical rolling deteriorate with increasing thickness of the base material, it has hitherto not been possible to produce roll-bonded clad metal sheets having these thicknesses and at the same time having the minimum toughness required (by the standard or customers).

For example, the roll-bonded clad metal sheet uses a carbon steel which corresponds to the standards API 5L, in particular API 5L grade X65, DNV OS-F101, ISO 3183 or comparable standards as metallic base material.

For example, the roll-bonded clad metal sheet uses a metallic base material layer which has a toughness corresponding to a notched impact strength of at least 50J at −70° C., in particular −80° C. and/or a matt fracture proportion after the Battelle drop weight tear test of at least 80% at −20° C., in particular −30° C.

For example, the roll-bonded clad metal sheet uses a metallic cladding material layer which has a thickness of equal to or greater than 2.0 mm, in particular equal to or greater than 2.5 mm.

BRIEF DESCRIPTION OF THE DRAWINGS

Working examples and embodiments of the invention are illustrated by way of example below with the aid of the schematic drawings, with a different degree of detail sometimes being used in the drawings. The drawings are not true to scale. The same reference numerals denote the same or similar parts.

DETAILED DESCRIPTION

Figure 1:
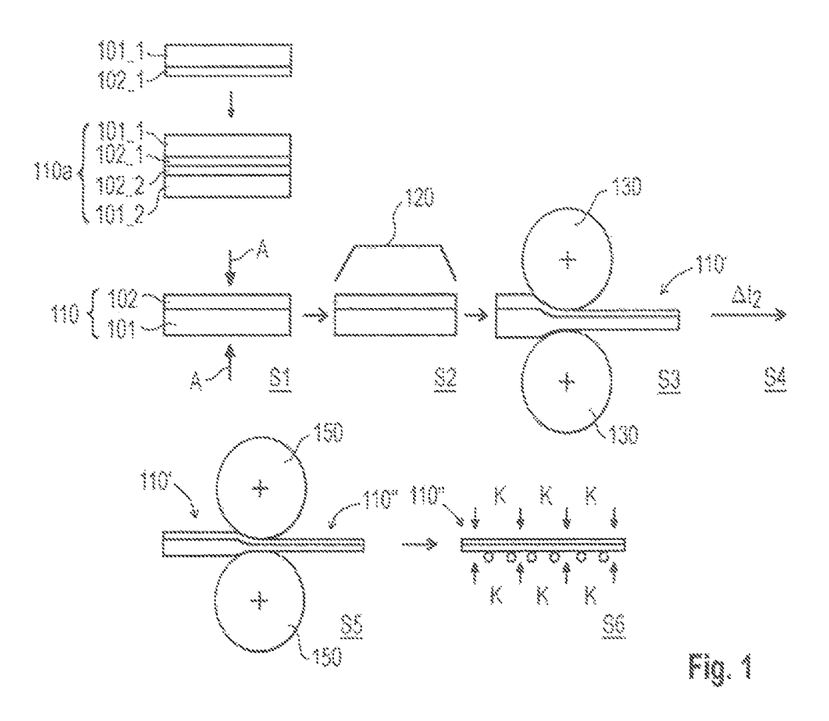
FIG. 1 shows various stages of a working example of a process according to the invention for producing roll-bonded clad metal sheets.

FIG. 1 shows a series of process stages of a working example of a process according to the invention for producing roll-bonded clad metal sheets.

In cladding by roll bonding, composite materials having a metallurgical bond between at least two layers composed of at least two different metallic materials are produced. Step S1 depicts a phase of the production process in which a cladding material layer 102 is laid on top of a base material layer 101.

Both the base material layer 101 and the cladding material layer 102 are previously produced metallic layers which initially rest on top of one another without a metallic bond. Both material layers 101, 102 can have been produced separately beforehand as metal sheets or strips in a factory producing metal products.

The layer thickness of the base material layer 101 is usually greater than the layer thickness of the cladding material layer 102. The task of the base material layer 101 is usually to withstand the static and dynamic loads while the cladding material layer 102 serves first and foremost to protect the base material layer 101 against corrosive attack by aggressive ambient media. However, the cladding material layer 102 can also be included partly or completely into the calculation of the wall strength of the finished roll-bonded clad metal sheet for withstanding the static and dynamic loads.

The base material can, for example, be a carbon steel. The cladding material can be, for example, a nickel-based alloy, in particular a nickel-chromium-molybdenum-niobium alloy.

The materials used for producing roll-bonded clad metal sheets and their physical properties are known and standardized in the industry. A customer requiring, for example, a roll-bonded clad metal sheet for offshore pipelines can, on the basis of the properties prescribed according to standards (chemical composition of the materials, layer thicknesses, corrosion resistance to various ambient media, toughness properties, strength and expansion properties, pit corrosion resistance, weldability, etc.), be assured that the particular requirements in respect of the abovementioned properties are satisfied. Particularly when roll-bonded clad metal sheets are used in the oil and gas sector, carbon steels which correspond to the applicable standard API 5L, in particular API 5L grade X65, DNV OS-F101, ISO 3183 or comparable standards, are usually employed as base material. As cladding material, use is made of, for example, a nickel-based alloy, for example Alloy 625 having the material number 2.4856, the chemical composition of which has been indicated above.

Apart from the one-sided application of the cladding material layer 102 to the base material layer 101 which is illustrated by way of example in FIG. 1, it is also possible to provide two-sided application of cladding material layers 102 to the base material layer 101 located in between. It is likewise possible for a plurality of base material layers 101 between which one or more cladding material layers 102 are arranged to be provided. A practical example of such a multilayer arrangement is shown in FIG. 1; here, two base material layers 101_1, 101_2 and two cladding material layers 102_1 and 102_2 are used and are arranged on top of one another in the order 101_1, 102_1, 102_2, 101_2, with a separation medium optionally being able to be introduced between the cladding material layers in order to avoid bonding between the two cladding materials. For example, ceramic materials can be used as separation media.

The placing of the material layers 101, 102 on top of one another is indicated by the arrows A in FIG. 1. The stack of layers produced by laying the material layers 101, 102 on top of one another is referred to as layer packet 110. The layer packet 110a, which is produced, for example, by placing the layers 101_1, 102_1 and 102_2, 101_2 on top of one another, is one of the possible variants according to which the layer 110 can be realized in practice.

The layer packet 110 is heated in step S2. According to FIG. 2, which shows an illustrative temperature profile of a working example of a process according to the invention, the layer packet 110 is heated to a temperature T1.

Heating can, for example, be effected in a furnace 120, see step S2 in FIG. 1. As furnace 120, it is possible to use, for example, a push furnace in which the layer packet 110 is pushed through the furnace 120 and discharged by means of a pushing and discharging device.

The layer packet 110 can be present in the furnace 120 for a first period of time $\Delta t_1$. During the time $\Delta t_1$, uniform heating over the cross section of the material layers 101, 102 can be achieved. The temperature T1 can, for example, be in the range from 1000° C. to 1200° C. In particular, the temperature can be the same as or higher or lower than 1050° C., 1100° C. or 1150° C.

Immediately after, for example, discharge of the layer packet 110 from the furnace 120 (step S2), the layer packet 110 is rolled in a first rolling phase WP1 (step S3). Rolling in the first rolling phase WP1 can consist of one or more rolling steps (passes). Rolling in the first rolling phase WP1 is also referred to as prerolling. Prerolling is usually carried out in one or more roll stands 130, with the number of passes compared to the number of roll stands (equal to or greater than one) being able to be increased by reversing rolling.

During prerolling (WP1), the materials are homogenized and the thickness of the layer packet 110 is reduced. Furthermore, the metallurgical bond between the base material layer 101 and the cladding material layer 102 is produced. The mechanical properties of the future roll-bonded clad metal sheet are not yet set during prerolling. The layer packet 110 having a reduced thickness is denoted by the reference symbol 110' in FIG. 1.

The layer packet 110' is subsequently cooled over a time $\Delta t_2$, see FIG. 1, step S4. During cooling, the temperature, for example, goes below the recrystallization stop temperature Trs. Cooling can, for example, be carried out in air and the cooling time $\Delta t_2$ can, for example, be from 1 to 3 minutes or else up to 15 minutes. The cooling time $\Delta t_2$ is usually dependent on the thickness of the layer packet 110' and on the desired temperature difference between the first rolling phase WP1 and the second rolling phase WP2 which follows the cooling time $\Delta t_2$.

Figure 2:
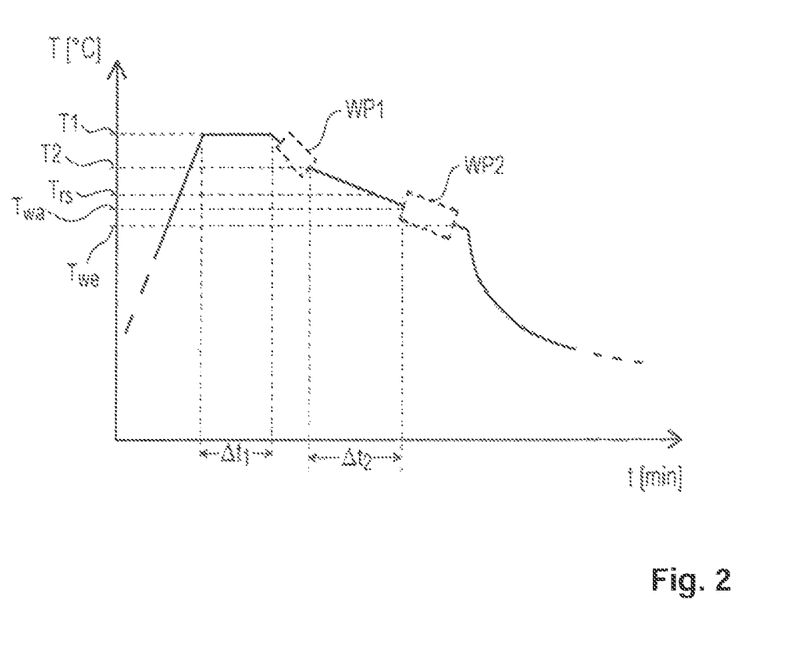
FIG. 2 shows a temperature profile of a working example of a process according to the invention.

As mentioned above, it is also possible, differently from what is shown merely by way of example in FIG. 2, to employ a temperature profile which does not decrease monotonically but has one or more intermediate heating phases during the cooling time $\Delta t_2$. In this case, too, it is advantageous for the temperature of the layer packet 110' to be below the recrystallization stop temperature Trs during the second rolling phase WP2 (or in some cases even at the beginning thereof), since otherwise the effect of the thermomechanical rolling process used here in respect of the desired improvement in the toughness properties of the finished product (roll-bonded clad metal sheet) becomes smaller.

Thermomechanical rolling differs from conventional hot rolling in that the last passes of the concluding rolling phase are carried out below Trs, with the entire rolling process usually comprising at least two rolling phases WP1 and WP2 with at least one intermediate, targeted, i.e. controlled in terms of time and/or temperature, cooling phase and possible intermediate heating phases. The (at least) second or concluding rolling phase WP2 of thermomechanical rolling is also referred to as final rolling or finishing rolling.

In FIG. 1, the second rolling phase WP2 is carried out in a roll stand 150 (see step S5) which can be identical to the roll stand 130 or differ from the roll stand 130. As in the case of prerolling, the finishing rolling (WP2) can be carried out in a reversing or nonreversing manner in one or more roll stands. Here too, the number of passes depends on the initial thickness of the layer packet 110', the desired reduction in thickness, the desired final degree of deformation, the physical properties of the materials which are rolled, etc.

The initial rolling temperature Twa in the rolling phase WP2 is selected in such a way that the final rolling temperature Twe has the desired target value of equal to or less than 880° C., in particular 850° C. The final rolling temperature Twe is defined as the temperature of the layer packet 110' in the finishing rolling (rolling phase WP2) immediately before the last rolling pass, i.e. immediately before the last entry into the roll stand 150. The temperatures are usually measured by means of a pyrometer and in this case represent the temperatures measured on the surface. However, average temperatures arithmetically averaged over the thickness of the metal sheet can also be employed for determining the temperature Twe (and also the other temperatures mentioned here).

As a result of the setting of a final rolling temperature Twe of equal to or less than 880° C., the finished product (roll-bonded clad metal sheet) has improved toughness properties. The lower the final rolling temperature Twe, the better the toughness properties which can be achieved by means of the thermomechanical cladding by roll bonding.

The layer packet after the finishing rolling (WP2) is denoted by the reference symbol 110". The finished rolled layer packet 110" has a thickness which is decreased further compared to the prerolled layer packet 110'. Furthermore, as mentioned above, the mechanical properties of the roll-bonded clad metal sheet are set during finishing rolling (WP2).

In step S6 (FIG. 1), the finished rolled layer packet 110" can be subjected to accelerated cooling compared to cooling in air, see also FIG. 2. The accelerated cooling can, for example, be achieved by means of a cooling medium, e.g. spraying water onto the finished rolled layer packet 110". The cooling medium is indicated by the arrows K in FIG. 1.

The accelerated cooling can, for example, be carried out to a temperature of 100° C. of the finished rolled layer packet 110". The accelerated cooling likewise has an advantageous effect on the achievable toughness properties of the roll-bonded clad metal sheet.

After the accelerated cooling, further process steps such as flattening, ultrasonic testing, cutting of the edges (for example by plasma cutting), optionally separating into smaller plates, grinding and final quality monitoring, which will not be described in detail here, can take place. The physical properties of the finished product (roll-bonded clad metal sheet) are set essentially by means of the (optional) step S6 of accelerated cooling.

The increase in the toughness or the improvement in the toughness properties of the roll-bonded clad metal sheets produced according to the invention is brought about mainly by the low final rolling temperature. Low final rolling temperatures in the range of the values indicated here have hitherto not been possible since these low temperatures did not make it possible for the metallurgical bond produced during preliminary deformation (i.e. prerolling in the first rolling phase WP1) to be maintained during finishing rolling (i.e. in the second rolling phase WP2). In conventional processes, finishing rolling at final rolling temperatures Twe of about 900° C. was just still possible, but at lower final rolling temperatures the previously produced metallurgical bond between the base material layer 101 and the cladding material layer 102 was torn apart again at the required degrees of deformation.

The reduction in the Nb content of the cladding material now makes it possible to reduce the final rolling temperature Twe without the metallurgical bond between the layers of material 101, 102 being damaged during finishing rolling (WP2). The damage-free finishing rolling (WP2) is made possible according to the invention by the relatively large difference between the yield stress of the cladding material and the yield stress of the base material at the rolling temperatures of the second rolling phase (WP2) being decreased by the reduction in the Nb content.

The higher the yield stress, the higher the deformation resistance of the material. When the yield stress is high, the material offers a high resistance to deformation and high rolling forces are required in order to be able to deform the material appropriately. When the yield stress is small, comparatively small rolling forces are sufficient to be able to carry out deformation.

The reduction in the difference between the yield stresses (i.e. deformabilities) of the cladding material and the base material results in a decrease in the mechanical stresses in the bonding plane between the cladding material and the base material. Tearing apart of the metallurgical bond, which is brought about by excessively high mechanical stresses, is avoided thereby.

Figure 3:
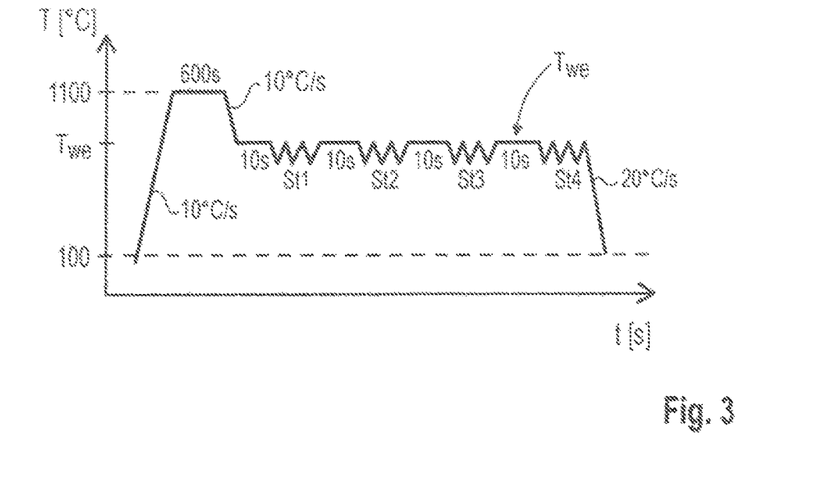
FIG. 3 shows a temperature profile of an example for determining the yield stress of a base material layer and a cladding material layer.
Figure 4:
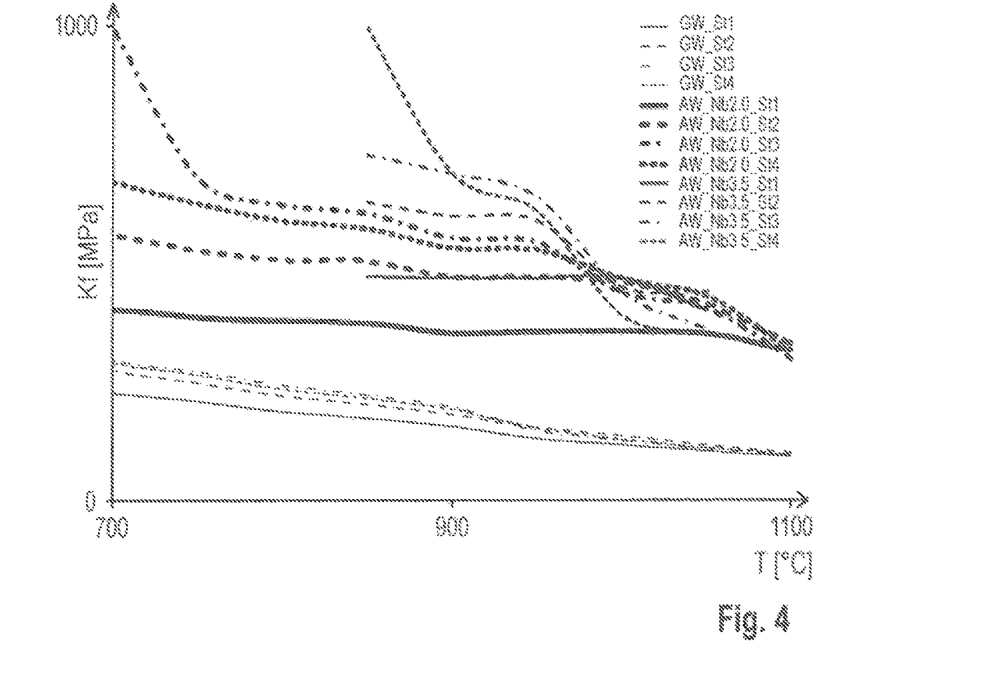
FIG. 4 depicts by way of example the yield stress curves of a base material layer and two cladding material layers having different Nb contents as a function of the temperature, with the number of passes during forming being reported as parameter.

FIGS. 3 and 4 serve to illustrate, by way of example, the yield stress behavior of base material and cladding material as a function of the temperature at different chemical compositions of the cladding material. The yield stresses of the cladding material and of the base material were measured by means of a dilatometer. For this purpose, samples of the materials used were subjected to heating and forming to simulate the rolling process, as shown in FIG. 3.

Firstly, the samples were heated to a temperature of 1100° C. and maintained at this temperature for a time of 600 seconds. The heating rate was 10° C./second. The samples were subsequently cooled at a rate of 10° C./second to a deformation temperature which replicates the final rolling temperature Twe in the actual production process for the roll-bonded clad metal sheets. At this deformation temperature Twe, four rolling passes St1, St2, St3 and St4 were carried out with in each case intermediate hold times of 10 seconds. The forming rate was in each case dPhi/dt=2.0. Accelerated cooling down to 100° C. at a cooling rate of 20° C./second was subsequently carried out.

The yield stresses of the samples were determined by means of a dilatometer in the first pass (St1), second pass (St2), third pass (St3) and fourth pass (St4). The experiments were carried out at different deformation temperatures Twe. The results of the experiments are shown in FIG. 4 for a base material (GW) having the designation GW8932 corresponding to API 5L grade X65, a cladding material Alloy 625 with Nb=3.5% (AW_Nb3.5) and a modified cladding material Alloy 625mod, which was identical to Alloy 625 but with Nb=2.0% and corresponding replacement of the reduced Nb content by Ni or Cr (AW_Nb2.0).

It can be seen from FIG. 4 that the yield stress Kf in units of MPa of the base material (carbon steel) increases only slowly in the direction of lower deformation temperatures T (corresponds to Twe) and differs only slightly for the passes St1, St2, St3 and St4. The deformation resistance of the base material GW thus displays little temperature dependence and increases only relatively slightly between the passes. The yield stress Kf versus temperature curves of the base material in the passes St1, St2, St3, St4 are denoted by GW_St1, GW_St2, GW_St3 and GW_St4.

The yield stress Kf versus temperature curves of the conventional cladding material Alloy 625 with Nb=3.5% in the passes St1, St2, St3, St4 are designated by AW_Nb3.5_St1, AW_Nb3.5_St2, AW_Nb3.5_St3 and AW_Nb3.5_St4. The cladding material Alloy 625 with Nb=3.5% displays, particularly at relatively high degrees of deformation (fourth pass St4) a significantly greater temperature dependence than the base material. As can be seen from FIG. 4, the yield stress Kf of the cladding material Alloy 625 with Nb=3.5% increases greatly when the temperature goes below about 900° C. in the fourth pass St4. This large increase leads to a rapidly increasing difference between the yield stresses of the base material and of the cladding material at higher degrees of deformation and lower temperatures, as a result of which the abovementioned destruction of the metallurgical bond between the materials occurs under these conditions.

The yield stress Kf versus temperature curves of the modified cladding material Alloy 625mod with Nb=2.0% in the passes St1, St2, St3, St4 are designated by AW_Nb2.0_St1, AW_Nb2.0_St2, AW_Nb2.0_St3 and AW_Nb2.0_St4. The yield stress versus temperature curves of the modified cladding material Alloy 625mod with Nb=2.0% are in each case below the temperature curves of the cladding material Alloy 625 with Nb=3.5%. Here too, an increase in the yield stress Kf in the direction of lower deformation temperatures Twe and higher degrees of deformation (larger number of passes) can be seen. However, the difference between the yield stresses of the base material and of the modified cladding material Alloy 625mod is smaller and in particular the significant increase in the yield stress in the direction of lower temperatures occurs only at a value of significantly below 800° C. at the maximum degree of deformation (St4). This is the cause of the metallurgical bond between the cladding material and the base material remaining intact at low final rolling temperatures Twe and the required degrees of deformation in the process of the invention using a cladding material having a reduced Nb content.

Figure 5:
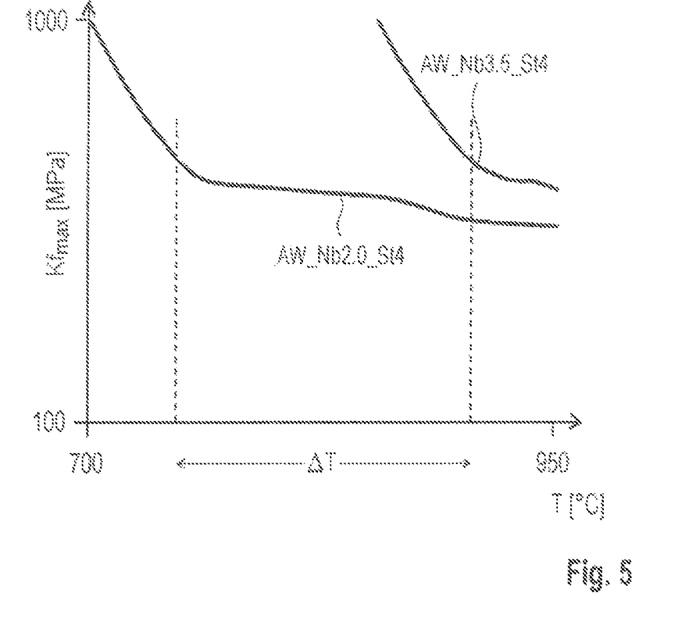
FIG. 5 shows by way of example the yield stress curve of a cladding material having an Nb content of 3.5% and the yield stress curve of an identically processed cladding material having an Nb content of 2.0%.

This difference in the yield stress behavior is shown once more in FIG. 5 in which the maximum yield stresses Kfmax (i.e. Kf in the fourth pass St4) in units of MPa of the conventional cladding material (Alloy 625) and of the modified cladding material (Alloy 625mod) are compared. The temperature window ΔT allows lower final rolling temperatures Twe and thus setting of the better toughness properties of the base material and of the roll-bonded clad metal sheet.

In the actual production of roll-bonded clad metal sheets, the stack of layers can be heated to the temperature indicated here (about 1100° C.±50° C. or ±100° C.). Since the first rolling phase (WP1) has no influence on the yield stress in the last passes in the second rolling phase (WP2), the first rolling phase (WP1) did not have to be replicated in the experiments presented in FIGS. 3 and 4, i.e. the passes St1, St2, St3 and St4 correspond to passes in the second rolling phase (WP2) in the actual production of the roll-bonded clad metal sheets. However, more passes (e.g. from 10 to 20 passes) are usually employed in the second rolling phase (WP2) in the actual production of roll-bonded clad metal sheets and the periods of time between the passes can be selected differently from those in the experiment shown here.

The toughness of the roll-bonded clad metal sheet is dependent both on the thickness of the metal sheet and also on the temperature in practical use. The lower the use temperature and the thicker the metal sheet, the lower the toughness (and, correspondingly, the higher the brittleness) of the metal sheet. The improved toughness properties discussed here can thus mean an increased toughness at the same use temperature and/or thickness of the metal sheet or the same toughness at lower use temperatures and/or greater thicknesses of the metal sheet.

Measures of the toughness are determined by standardized measurement methods, for example by determining the notched impact strength and/or by determining the matt fracture proportion in the Battelle drop weight tear test (BDWTT). Reduction of the Nb content of the cladding material from 3.5% to, for example, 2.0% (i.e. use of Alloy 625mod instead of Alloy 625) made it possible to improve the notched impact strength from >50J at a test temperature of −60° C. and a thickness of the base material of 25 mm to a value of >50J at a test temperature of −80° C. and a thickness of the base material of 40 mm. The matt fracture proportion in the BDWTT could be improved from at least 80% at a test temperature of −10° C. and a thickness of the base material of 25 mm to at least 80% at a test temperature of −30° C. and a thickness of base material of 40 mm, i.e. the toughness values required by the customer can be guaranteed for thicker metal sheets and/or at lower use temperatures. The base material here corresponded to the abovementioned standard API 5L X65 or comparable standards.

The modification of the cladding material had no adverse effects on its good corrosion protection properties. Corrosion protection properties are in industry likewise assessed by known, standardized measurement methods. At a thickness both of the conventional cladding material (Alloy 625 with material number 2.4856) and the modified cladding material (corresponding to Alloy 625mod) of 3 mm, a maximum annual loss of material of 1.2 mm/a was found in the Streicher test ASTM G 28 A and in each case no pit corrosion was found at 50° C. in the pit corrosion test ASTM G 48 A. The same results were also obtained for other materials of the standard, namely Alloy 625 with material designations UNS N06625, LC2262, etc.

In order to examine the effect of the reduction in the Nb content on the corrosion, 10 kg laboratory batches were melted.

Tables 1A and 1B show the analyses of the batches melted on the laboratory scale together with some industrially melted batches Alloy 625 according to the prior art employed for comparison. The batches according to the prior art are denoted by a T, and the batches according to the invention are denoted by an E. The batches melted on the laboratory scale are denoted by an L, and the industrially melted batches are denoted by a G. The industrially melted batch 135896 is a batch of Alloy 625 according to the prior art. The batch 250537 is Alloy 625 but is melted as laboratory batch and serves as reference and to ensure comparability of results on laboratory batches and industrial batches. All batches have a similar PREN, which determines the pit corrosion resistance, of from 50.07 to 51.28.

The resistance to pit corrosion is given by the following empirical formula:

$$PREN=Cr+3.3(Mo+W)+16*N.$$

Cr, Mo, W, N here are the contents of the elements in % by mass. High contents of Cr, Mo, W and N result in a high resistance to pit corrosion. PREN is an empirical formula apart from which there can be further influencing parameters.

The blocks of the alloys melted under reduced pressure on the laboratory scale, as in Tables 1A and 1B, were heat treated in the range from 1100° C. to 1250° C. for from 0.1 to 70 hours and hot rolled by means of hot rolling and further intermediate heat treatments in the range from 1100° C. to 1250° C. for from 0.1 to 10 hours to a final thickness of 12 mm. The metal sheets were then recrystallized in the range from 950° C. to 1050° C. The samples required for the measurements were produced from these metal sheets.

The industrially melted comparative batch was melted open, followed by treatment in a VOD plant and cast as continuous casting. The continuously cast blocks were heat treated in the range from 1100° C. to 1250° C. for from 0.1 minute to 70 hours, optionally under protective gas such as argon or hydrogen, followed by cooling in air and hot rolled in the moving heat treatment atmosphere or in a water bath by means of hot rolling and further intermediate heat treatment in the range from 1100° C. to 1250° C. for from 0.1 to 20 hours to a final thickness of 5 or 16 mm. The metal sheets were then recrystallized in the range from 950° C. to 1050° C. The samples required for the measurements were produced from these metal sheets.

The samples required for the corrosion tests were finally ground all around the periphery and then cleaned.

Figure 6:
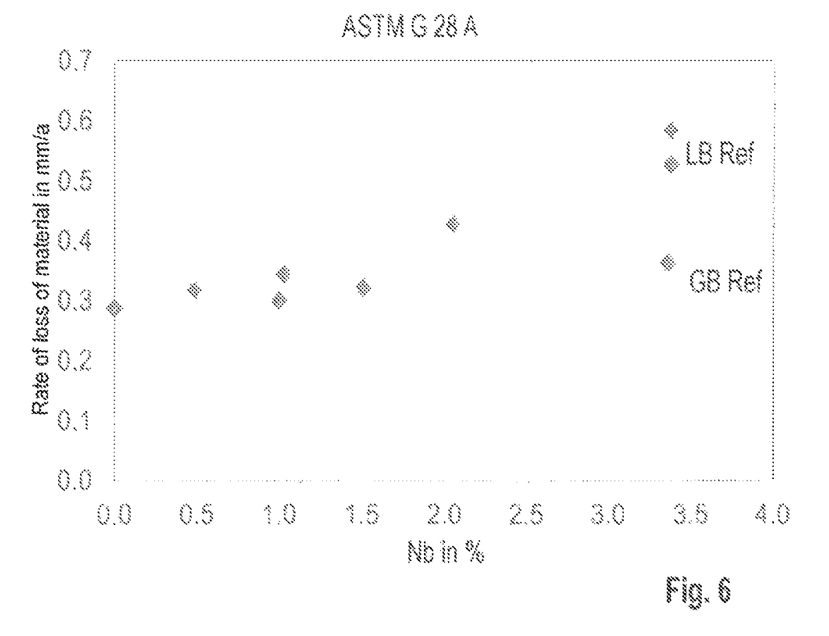
FIG. 6 shows a graph in which the rate of loss of material in mm/a determined in the Streicher test ASTM G 28 A is plotted against the Nb content in % by mass for various cladding materials.

A corrosion test in accordance with ASTM G 28 A was carried out. This test measures the sensitivity of a material to intercrystalline corrosion. The result is shown in FIG. 6 as a plot of the rate of loss of material against the Nb content and in Table 2 by means of numerical values. It should firstly be noted that the reference laboratory batch 250537 (LB Ref in FIG. 6) displays a higher rate of loss of material than the industrial comparative batch 135896 (GT Ref in FIG. 6). This can be observed in the case of laboratory batches in some tests because of the unfavorable surface area-to-volume ratio compared to industrial batches. All laboratory batches having a comparatively low Nb content display a low rate of loss of material, so that it can be taken that the intercrystalline corrosion in accordance with ASTM G 28 A does not become worse when the Nb content is reduced to ≤2.8% of Nb.

In addition, a corrosion test in accordance with ASTM G 48 C was carried out. This test measures the sensitivity of a material to pit corrosion. The test was modified slightly here since only limited amounts of sample material are available in the case of the laboratory batches, so that a fresh sample cannot be taken for each temperature. The first test was carried out at 50° C., and in the case of the lower Nb contents also at 40° C. The sample was then weighed and once again put in fresh solution but at 5° C. higher. This was repeated until significant pit corrosion occurred, which can be seen from the step increase in the loss in mass and significant pit formation. The first temperature at which this occurred is the critical pit corrosion temperature (CPT). A material is all the more insensitive to pit corrosion, the higher this temperature (the test modified in this way has a tendency to give a higher CPT than a test in which fresh samples are taken for each temperature).

Figure 7:
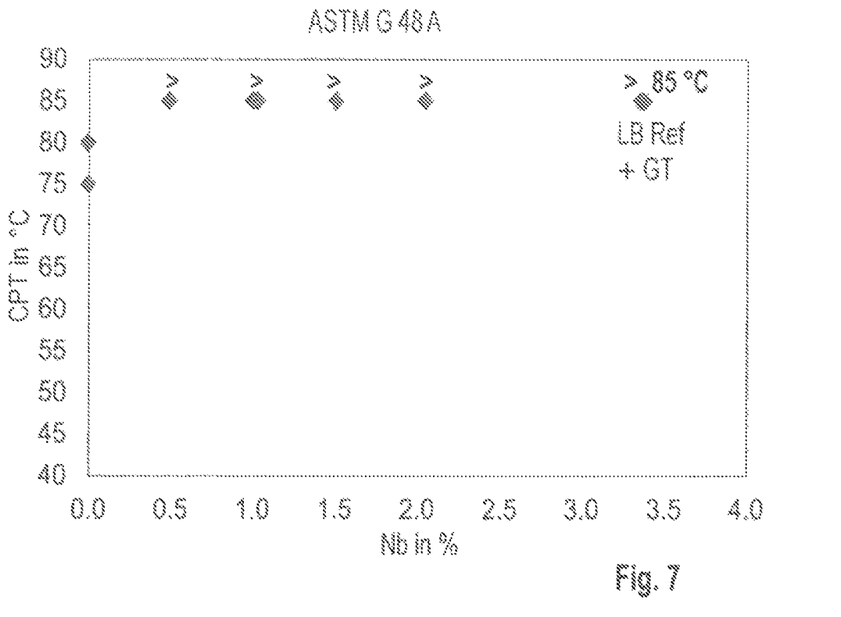
FIG. 7 shows a graph in which the critical pit corrosion temperature CPT in ° C. determined in the corrosion test ASTM G 48 C is plotted against the Nb content in % by mass for various cladding materials.

The result is shown in FIG. 7 as a plot of the critical pit corrosion temperature CPT in ° C. against the Nb content or in Table 2 as numerical values. It may firstly be noted that here the reference laboratory batch 250537 (LB Ref in FIG. 7) and the industrial batch 135896 (GT in FIG. 7) achieve the maximum temperature of the test without displaying pit corrosion. Likewise, all laboratory batches having an Nb content of Nb≥0.5% also achieve the maximum temperature. Only the batch without Nb displays a lower pit corrosion temperature, which was confirmed by repetition of the test. For this reason, the Nb content should not be reduced to 0 but preferably be Nb≥0.5% so that the sensitivity to pit corrosion in accordance with ASTM G 48 C is not worsened by reduction of the Nb content. As mentioned above, PREN is an empirical formula apart from which there can be further influencing parameters.

Materials such as Alloy 625 are so corrosion resistant that the limits of the modified test in accordance with ASTM G 48 C are reached. For this reason, a more severe variant of this test, known as the "Green Death Test", was employed.

Figure 8:
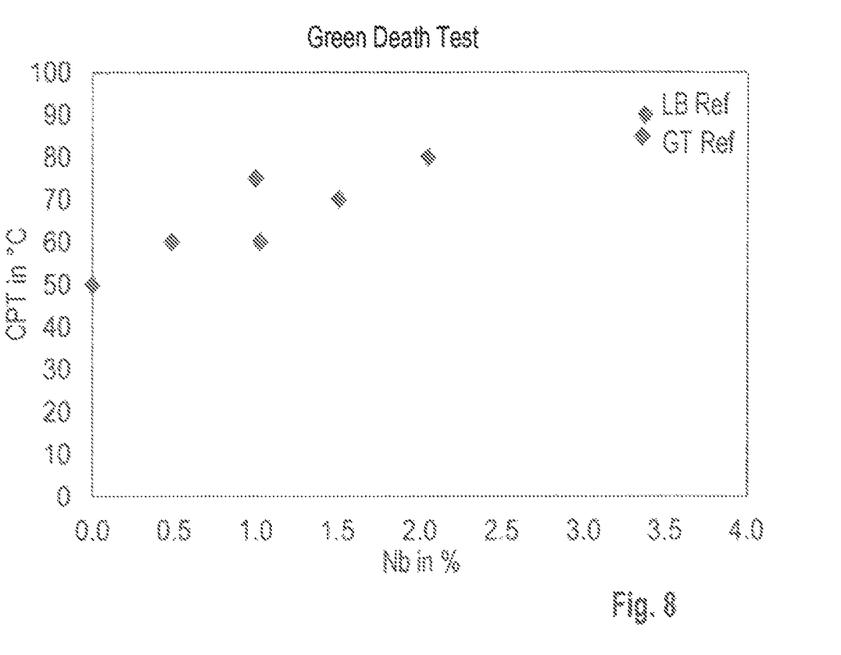
FIG. 8 shows a graph in which the critical pit corrosion temperature CPT in ° C. determined in the Green Death Test is plotted against the Nb content in % by mass for various cladding materials.

This test is carried out in the same way as the modified test in accordance with ASTM G 48 C with the only change being that a test solution comprising 11.5% of $H_2SO_4$+1.2% of HCl+1% of $FeCl_3$+1% of $CuCl_2$ is used instead of a test solution comprising 6% of $FeCl_3$ and 1% of HCl. The result is shown in FIG. 8 as a plot of the critical pit corrosion temperature CPT against the Nb content and in Table 2 as numerical values. Here too, it may be noted that the reference laboratory batch 250537 (LB Ref in FIG. 8) and the industrial batch 135896 (GT Ref in FIG. 8) barely differ in terms of their critical pit corrosion temperature. Above about 2% of Nb, the measured critical pit corrosion temperatures are within the range of statistical scatter, while below about 1.5% of Nb a noticeable reduction can be observed. For this reason, the Nb content should preferably be Nb≤1.5% so that the sensitivity to pit corrosion in the Green Death Test is not appreciably impaired.

It may be assumed that the results explained here with the aid of examples are generally valid statements which can be applied to all materials described in this disclosure.

TABLE 1A

Composition of the industrially melted batches and the laboratory batches, part 1. All concentrations are in % by mass (column S1 - T: alloy according to the prior art, E: alloy according to the invention column S2 - L: melted on the laboratory scale, G: industrially melted).

| Batch | S1 | S2 | Ni | Cr | Fe | C | Mn | Si | Co | Al | Ti | P | Mo | Nb + Ta |
|---|---|---|---|---|---|---|---|---|---|---|---|---|---|---|
| 250537 | T | L | 61.1 | 21.6 | 4.54 | 0.014 | <0.01 | 0.15 | <0.01 | 0.14 | 0.2 | 0.003 | 8.74 | 3.38 |
| 250530 | E | L | 64.4 | 21.9 | 4.7 | 0.014 | <0.01 | 0.11 | 0.01 | 0.05 | 0.17 | 0.007 | 8.61 | <0.01 |
| 250532 | E | L | 64.4 | 21.2 | 4.59 | 0.013 | <0.01 | 0.15 | 0.01 | 0.1 | 0.18 | 0.007 | 8.86 | 0.49 |
| 250533 | E | L | 63.1 | 21.9 | 4.54 | 0.013 | <0.01 | 0.15 | 0.01 | 0.11 | 0.2 | 0.006 | 8.88 | 1.00 |
| 250534 | E | L | 63.2 | 21.9 | 4.56 | 0.021 | <0.01 | 0.16 | 0.01 | 0.16 | 0.21 | 0.006 | 8.68 | 1.03 |
| 250535 | E | L | 62.7 | 22.0 | 4.54 | 0.012 | <0.01 | 0.14 | 0.01 | 0.14 | 0.22 | 0.005 | 8.63 | 1.51 |
| 250536 | E | L | 62.2 | 22.0 | 4.56 | 0.011 | <0.01 | 0.15 | 0.01 | 0.13 | 0.22 | 0.005 | 8.64 | 2.05 |
| 135896 | T | G | 61.3 | 21.2 | 4.64 | 0.021 | 0.07 | 0.18 | 0.04 | 0.17 | 0.19 | 0.004 | 8.67 | 3.36 |

TABLE 1B

Composition of the industrially melted batches and the laboratory batches, part 2. All concentrations in % by mass.

| Batch | S | Ta | B | Cu | W | V | N | Mg | Ca | Pb | PREN |
|---|---|---|---|---|---|---|---|---|---|---|---|
| 250537 | 0.002 | <0.01 | | <0.01 | | <0.01 | 0.006 | 0.012 | <0.001 | | 50.56 |
| 250530 | 0.002 | <0.01 | | <0.01 | | <0.01 | 0.006 | 0.005 | <0.001 | | 50.38 |
| 250532 | 0.002 | <0.01 | | <0.01 | | <0.01 | 0.002 | 0.007 | <0.001 | | 50.44 |
| 250533 | 0.002 | <0.01 | | <0.01 | | 0.01 | 0.004 | 0.007 | <0.001 | | 51.28 |
| 250534 | 0.002 | <0.01 | | <0.01 | | <0.01 | 0.006 | 0.009 | <0.001 | | 50.63 |
| 250535 | 0.002 | <0.01 | | <0.01 | | 0.01 | 0.006 | 0.011 | <0.001 | | 50.58 |
| 250536 | 0.002 | <0.01 | | <0.01 | | <0.01 | 0.006 | 0.008 | <0.001 | | 50.56 |
| 135896 | 0.002 | 0.01 | 0.001 | 0.01 | 0.01 | 0.04 | 0.016 | 0.016 | 0.001 | <0.001 | 50.07 |

TABLE 2

Results of the corrosion tests in accordance with ASTM G 28 A, the modified test in accordance with ASTM G 48 C and the Green Death Test.

| Batch | | | Rate of loss of material in mm/a G 28 A | CPT in ° C. Modified ASTM G 48 C | CPT in ° C. Green Death Test (modified ASTM G 48 C) |
|---|---|---|---|---|---|
| 250537 | T | L | 0.526 | 75 | 90 |
|  |  |  |  | 80 |  |
| 250530 |  | L | 0.288 | >85 | 50 |
| 250532 |  | L | 0.317 | >85 | 60 |
| 250533 |  | L | 0.299 | >85 | 75 |
| 250534 |  | L | 0.344 | >85 | 60 |
| 250535 | E | L | 0.321 | >85 | 70 |
| 250536 | E | L | 0.427 | >85 | 80 |
| 135896 | T | T | 0.362 | >85 | 85 |

The invention claimed is:

1. A process for producing a roll-bonded clad metal sheet, wherein the process comprises:
bringing together a metallic base material layer and a metallic cladding material layer to produce an intermediate layer packet;
heating the intermediate layer packet to yield a heated layer packet;
thermomechanical rolling the heated layer packet, comprising:
performing a first rolling phase for prerolling the heated layer packet to form a metallurgical bond between the metallic base material layer and the metallic cladding material layer;
cooling the heated layer packet after the first rolling phase; and
performing a second rolling phase for final forming of a layer packet, wherein:
the metallic cladding material layer comprises a nickel-based material whose chemical composition comprises, in % by mass, 58%≤Ni≤73%, 20%≤Cr≤25%, 0%≤Fe≤5%, 0%≤C≤0.1%, 0%≤Mn≤0.5%, 0%≤Si≤0.5%, 0%≤Co≤1%, 0%≤Al≤0.4%, 0%≤Ti≤0.4%, 0%≤P≤0.015%, 0%≤S≤0.015%, 8%≤Mo≤10%, 1.5%≤Nb+Ta≤2.8%, and balance impurities, and
a final rolling temperature of the second rolling phase is set to a value equal to or less than 880° C.

2. The process as claimed in claim 1, wherein a proportion of Nb is ≤2.5%.

3. The process as claimed in claim 1, wherein the chemical composition comprises, in % by mass, one or more of the following elements:
0%≤Ta≤1%, 0%≤B≤0.008%, Cu≤0.5%, W≤1%, V≤0.5%, N≤0.05%, Mg≤0.05%, Ca≤0.05%, Pb≤0.002%, Zn≤0.002%, or Sn≤0.002%.

4. The process as claimed in claim 1, wherein the metallic base material layer comprises a carbon steel.

5. The process as claimed in claim 4, wherein the carbon steel has, in % by mass, carbon content of C≤0.30% and a chemical composition comprising one or more of the ranges:
0%≤Si≤0.50%, 1.10%≤Mn≤1.65%, 0%≤P≤0.022%, 0%≤S≤0.010%, 0%≤Nb≤0.05%, 0%≤Ti≤0.06%, or 0%≤V≤0.10%.

6. The process as claimed in claim 1, wherein the first rolling phase is carried out at an initial rolling temperature of from 1000° C. to 1200° C.

7. The process as claimed in claim 1, wherein the final rolling temperature is lower than a recrystallization stop temperature of the metallic base material layer.

8. The process as claimed in claim 1, wherein the cooling comprises cooling the heated layer packet in air for a cooling time from 3 to 15 minutes.

9. The process as claimed in claim 1, wherein the nickel-based material is a nickel-chromium-molybenum-niobium alloy.

10. The process as claimed in claim 1, wherein the final rolling temperature is set to a value equal to or less than 850° C.

11. A process for producing a roll-bonded clad metal sheet, wherein the process comprises:
bringing together a metallic base material layer and a metallic cladding material layer to produce an intermediate layer packet;
heating the intermediate layer packet to yield a heated layer packet;
thermomechanical rolling the heated layer packet, comprising:
performing a first rolling phase for prerolling the heated layer packet to form a metallurgical bond between the metallic base material layer and the metallic cladding material layer;
cooling the heated layer packet after the first rolling phase; and
performing a second rolling phase for final forming of a layer packet, wherein:
the metallic cladding material layer comprises a nickel-based material whose chemical composition comprises, in % by mass, a proportion of more than 50% of Ni and a proportion of 0.5%≤Nb≤3.1%, and
a final rolling temperature of the second rolling phase is set to a value equal to or less than 880° C. and is lower than a recrystallization stop temperature of the metallic base material layer.

12. The process as claimed in claim 11, wherein the proportion of Nb is 2.5%.

13. The process as claimed in claim 11, wherein the nickel-based material is a nickel-based alloy.

14. The process as claimed in claim 11, wherein the first rolling phase is carried out at an initial rolling temperature of from 1000° C. to 1200° C.

15. The process as claimed in claim 11, wherein the cooling comprises cooling the heated layer packet in air for a cooling time from 3 to 15 minutes.

16. A process for producing a roll-bonded clad metal sheet, wherein the process comprises:
bringing together a metallic base material layer and a metallic cladding material layer to produce an intermediate layer packet;
heating the intermediate layer packet to yield a heated layer packet;
thermomechanical rolling the heated layer packet, comprising:
performing a first rolling phase for prerolling the heated layer packet to form a metallurgical bond between the metallic base material layer and the metallic cladding material layer;
cooling the heated layer packet after the first rolling phase, wherein the cooling comprises cooling the heated layer packet in air for a cooling time from 3 to 15 minutes; and
performing a second rolling phase for final forming of a layer packet, wherein:
the metallic cladding material layer comprises a nickel-based material whose chemical composition comprises, in % by mass, a proportion of more than 50% of Ni and a proportion of 0.5%≤Nb≤3.1%, and
a final rolling temperature of the second rolling phase is set to a value equal to or less than 880° C.

17. The process as claimed in claim 16, wherein the proportion of Nb is ≤2.5%.

18. The process as claimed in claim 16, wherein the final rolling temperature is set to a value equal to or less than 850° C.

19. A process for producing a roll-bonded clad metal sheet, wherein the process comprises:
bringing together a metallic base material layer and a metallic cladding material layer to produce an intermediate layer packet;
heating the intermediate layer packet to yield a heated layer packet;
thermomechanical rolling the heated layer packet, comprising:
performing a first rolling phase for prerolling the heated layer packet to form a metallurgical bond between the metallic base material layer and the metallic cladding material layer;
cooling the heated layer packet after the first rolling phase; and
performing a second rolling phase for final forming of a layer packet, wherein:
the metallic cladding material layer comprises a nickel-based material whose chemical composition comprises, in % by mass, a proportion of more than 50% of Ni and a proportion of 0.5%≤Nb≤3.1%, and
a final rolling temperature of the second rolling phase is set to a value equal to or less than 850° C.

* * * * *